United States Patent
Morin et al.

(10) Patent No.: US 11,543,927 B1
(45) Date of Patent: Jan. 3, 2023

(54) METHOD AND SYSTEM FOR RULE-BASED COMPOSITION OF USER INTERFACES

(71) Applicants: Yao Morin, San Diego, CA (US); Jay Yu, San Diego, CA (US)

(72) Inventors: Yao Morin, San Diego, CA (US); Jay Yu, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 697 days.

(21) Appl. No.: 15/859,187

(22) Filed: Dec. 29, 2017

(51) Int. Cl.
*G06F 3/0481* (2022.01)
*G06N 5/02* (2006.01)
*G06N 20/00* (2019.01)

(52) U.S. Cl.
CPC ........... *G06F 3/0481* (2013.01); *G06N 5/025* (2013.01); *G06N 20/00* (2019.01)

(58) Field of Classification Search
CPC ........ G06F 3/0481; G06F 15/18; G06N 5/025
See application file for complete search history.

(56) References Cited

U.S. PATENT DOCUMENTS

| | | | |
|---|---|---|---|
| 9,552,553 B1 * | 1/2017 | Wilson | G06Q 10/083 |
| 2006/0020596 A1 * | 1/2006 | Liu | G06F 17/30867 |
| 2007/0300185 A1 * | 12/2007 | Macbeth | G06F 9/451 |
| | | | 715/825 |
| 2008/0148150 A1 * | 6/2008 | Mall | G06F 3/038 |
| | | | 715/707 |
| 2011/0137941 A1 * | 6/2011 | Hoffman | G06F 16/9535 |
| | | | 707/779 |
| 2012/0150772 A1 * | 6/2012 | Paek | G06N 5/025 |
| | | | 706/12 |
| 2012/0226559 A1 * | 9/2012 | Baum | G06Q 30/02 |
| | | | 705/14.66 |
| 2014/0372351 A1 * | 12/2014 | Sun | G06F 16/353 |
| | | | 706/12 |
| 2015/0067531 A1 * | 3/2015 | Adimatyam | G06F 3/0481 |
| | | | 715/745 |
| 2015/0081449 A1 * | 3/2015 | Ge | G06F 17/30867 |
| | | | 705/14.66 |
| 2015/0227983 A1 * | 8/2015 | Eustace | H04W 4/21 |
| | | | 705/7.33 |
| 2016/0147828 A1 * | 5/2016 | Yu | G06F 17/30654 |
| | | | 705/31 |
| 2016/0291807 A1 * | 10/2016 | Chong | G06Q 30/08 |
| 2017/0255862 A1 * | 9/2017 | Li | G06N 20/00 |
| 2017/0269791 A1 * | 9/2017 | Meyerzon | G06F 3/0481 |

(Continued)

*Primary Examiner* — Daniel W Parcher
(74) *Attorney, Agent, or Firm* — Ferguson Braswell Fraser Kubasta

(57) ABSTRACT

A method for rule-based composition of user interfaces involves obtaining a user identity (ID) of a user accessing an application using a user interface and obtaining a user interface (UI) state of the user interface. Based on the UI state and based on the user ID, a plurality of rule-based recipes are obtained. Each rule-based recipe specifies a UI content suitable for an interaction between the user and the user interface. The method further includes ranking each of the rule-based recipes of the plurality of rule-based recipes based on a likeliness that the rule-based recipe is suitable, given the UI state and the user ID, identifying, from the ranked plurality of rule-based recipes, a highest-ranked rule-based recipe, obtaining the UI content specified by the highest-ranked rule-based recipe, and updating the user interface with the UI content.

24 Claims, 6 Drawing Sheets

(56) References Cited

U.S. PATENT DOCUMENTS

| | | | |
|---|---|---|---|
| 2017/0344626 A1* | 11/2017 | Pitelka | H04L 67/306 |
| 2018/0053199 A1* | 2/2018 | Mathis | G06F 16/285 |
| 2018/0121964 A1* | 5/2018 | Zhang | G06Q 30/0269 |
| 2018/0189077 A1* | 7/2018 | Gupta | G06F 9/453 |
| 2018/0349977 A1* | 12/2018 | Codella | G06Q 30/0631 |

* cited by examiner

|  | Content 1 | Content 2 | Content 3 | Content 4 | Content 5 |
|---|---|---|---|---|---|
| Content 1 | 1 | 0.9 | 1 | 0.7 | 0 |
| Content 2 |  | 1 | 0.5 | 0.4 | 0.9 |
| Content 3 |  |  | 1 | 0.3 | 1 |
| Content 4 |  |  |  | 1 | 0.2 |
| Content 5 |  |  |  |  | 1 |

*FIG. 4A*

| | |
|---|---|
| 1. Content Recommendation | 0.9 |
| 2. Content Recommendation | 0.5 |
| 3. Content Recommendation | 0.5 |
| 4. Content Recommendation | 0.2 |
| 5. Content Recommendation | 0.1 |

METHOD AND SYSTEM FOR RULE-BASED COMPOSITION OF USER INTERFACES

BACKGROUND

User interfaces enable users to navigate through software applications. Some software applications may allow complex interactions that may need to be accommodated by the user interface. To support these interactions, suitable user interface content such as text, selectors, menus, etc. needs to be presented to the user. Suitable user interface content may be specified by rules.

SUMMARY

In general, in one aspect, one or more embodiments relate to a method for rule-based composition of user interfaces, comprising: obtaining a user identity (ID) of a user accessing an application using a user interface; obtaining a user interface (UI) state of the user interface; obtaining, based on the UI state and based on the user ID, a plurality of rule-based recipes, wherein each rule-based recipe specifies a UI content suitable for an interaction between the user and the user interface; ranking each of the rule-based recipes of the plurality of rule-based recipes based on a likeliness that the rule-based recipe is suitable, given the UI state and the user ID; identifying, from the ranked plurality of rule-based recipes, a highest-ranked rule-based recipe; obtaining the UI content specified by the highest-ranked rule-based recipe; and updating the user interface with the UI content.

In general, in one aspect, one or more embodiments relate to a system for rule-based composition of user interfaces, comprising: an application; a user interface enabling a user to access the application; a computer processor; a recipe ranker executing on the computer processor configured to: obtain a user identity (ID) of the user accessing the application using the user interface; obtain a user interface (UI) state of the user interface; obtain, based on the UI state and based on the user ID, a plurality of rule-based recipes, wherein each rule-based recipe specifies a UI content suitable for an interaction between the user and the user interface; rank each of the rule-based recipes of the plurality of rule-based recipes based on a likeliness that the rule-based recipe is suitable, given the UI state and the user ID; identify, from the ranked plurality of rule-based recipes, a highest-ranked rule-based recipe; and a content loader configured to obtain the UI content specified by the highest-ranked rule-based recipe, and wherein the user interface is updated with the UI content.

In general, in one aspect, one or more embodiments relate to a non-transitory computer readable medium including computer readable program code for causing a computer system to obtain a user identity (ID) of a user accessing an application using a user interface; obtain a user interface (UI) state of the user interface; obtain, based on the UI state and based on the user ID, a plurality of rule-based recipes, wherein each rule-based recipe specifies a UI content suitable for an interaction between the user and the user interface; rank each of the rule-based recipes of the plurality of rule-based recipes based on a likeliness that the rule-based recipe is suitable, given the UI state and the user ID; identify, from the ranked plurality of rule-based recipes, a highest-ranked rule-based recipe; obtain the UI content specified by the highest-ranked rule-based recipe; and update the user interface with the UI content.

Other aspects of the invention will be apparent from the following description and the appended claims.

BRIEF DESCRIPTION OF DRAWINGS

FIGS. 4A and 4B show exemplary data structures in accordance with one or more embodiments.

DETAILED DESCRIPTION

Figure 1A:
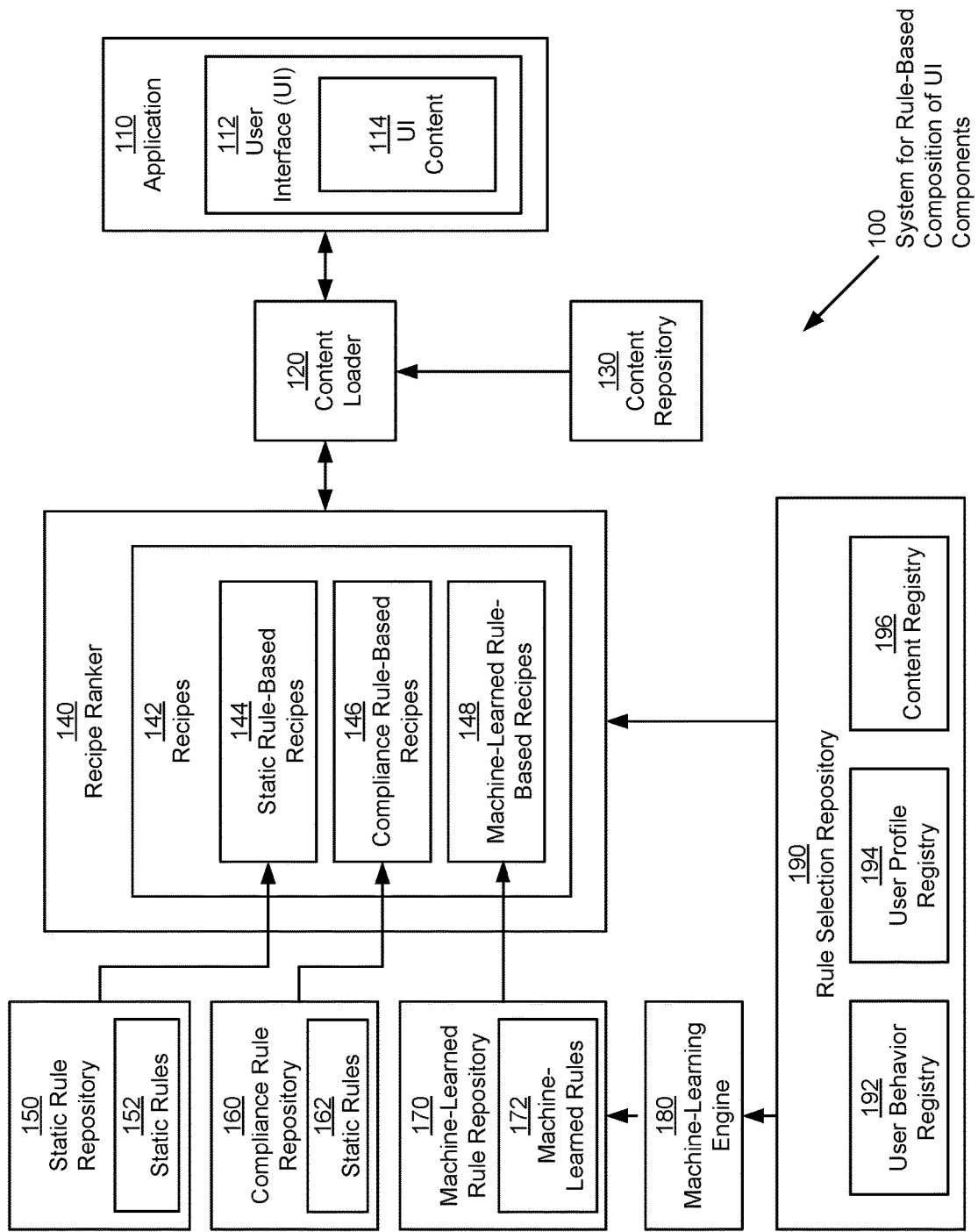
FIG. 1A shows a system for rule-based composition of user interfaces in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments provide a method and a system for rule-based composition of user interfaces. A user interface (UI) may enable a user accessing the user interface to interact with a software application. Some software applications may allow complex interactions that may all need to be accommodated by the user interface. To support these interactions, suitable UI content needs to be presented to the user. Suitable UI content may be specified by rules that enable selection of UI content in a user and scenario-specific manner.

In one or more embodiments, the UI content to be provided via the UI is determined based on static rules. Such static rules may define the UI content to be provided to the user via the user interface in a manner depending on the state of the user interface (UI state). The UI state may include, for example, the currently displayed UI content, but may also include a history of UI content. When a certain UI state is detected, this may trigger the presentation of certain UI content, based on a static rule. The same UI content will always and reproducibly be displayed when reaching a particular UI state, unless the static rules are updated.

In one or more embodiments, the UI content to be provided via the UI is determined based on compliance rules. Compliance rules may ensure that certain compliance requirements, for example government regulations, are met, but also to ensure that UI content that is considered desirable is presented to a user. Assume, for example, that the user interface provides content of an income tax software to a user. In the example, the tax code specifies that charitable donations are deductible. Accordingly, for a high-income individual, claiming a deduction for charitable donations is likely to be a meaningful option, and accordingly the UI content should provide the corresponding dialog boxes. In contrast, it is unlikely that a low-income individual is able to afford charitable donations, and accordingly the UI content does not need to include the dialog boxes associated with charitable donations.

In one or more embodiments, the UI content to be provided via the user interface is determined based on machine-learned rules that may have been generated from large amounts of data. These data may include user information, e.g., user preferences, previously observed user behaviors, other user characteristics and/or information that characterizes the UI content. Rules may be established from these data, e.g. based on patterns detected in the data. These rules may be user-specific and may further change as new data become available.

Static rules, compliance rules and machine-learned rules are further described below. In one or more embodiments, the UI content is determined based on the static rules, the compliance rules and/or the machine-learned rules. More specifically, these rules may be translated into recipes that specify the individual elements of the UI content to be provided via the user interface. While a rule may specify an action, the associated recipe may specify the UI content that needs to be provided to a user to complete the action. Consider the previously introduced example of claiming a tax deduction for charitable donations. Assume that a rule states that the option for deducting charitable donations is to be presented to the user via the user interface. As a result, a recipe that specifies UI components that may enable the user to claim a deduction for charitable donations is generated. These UI components may include a description of available deductions, fields that enable entry of donations made, etc. The use of rules to generate recipes, and the use of recipes to populate a user interface with UI content is described in detail below.

Figure 1B:
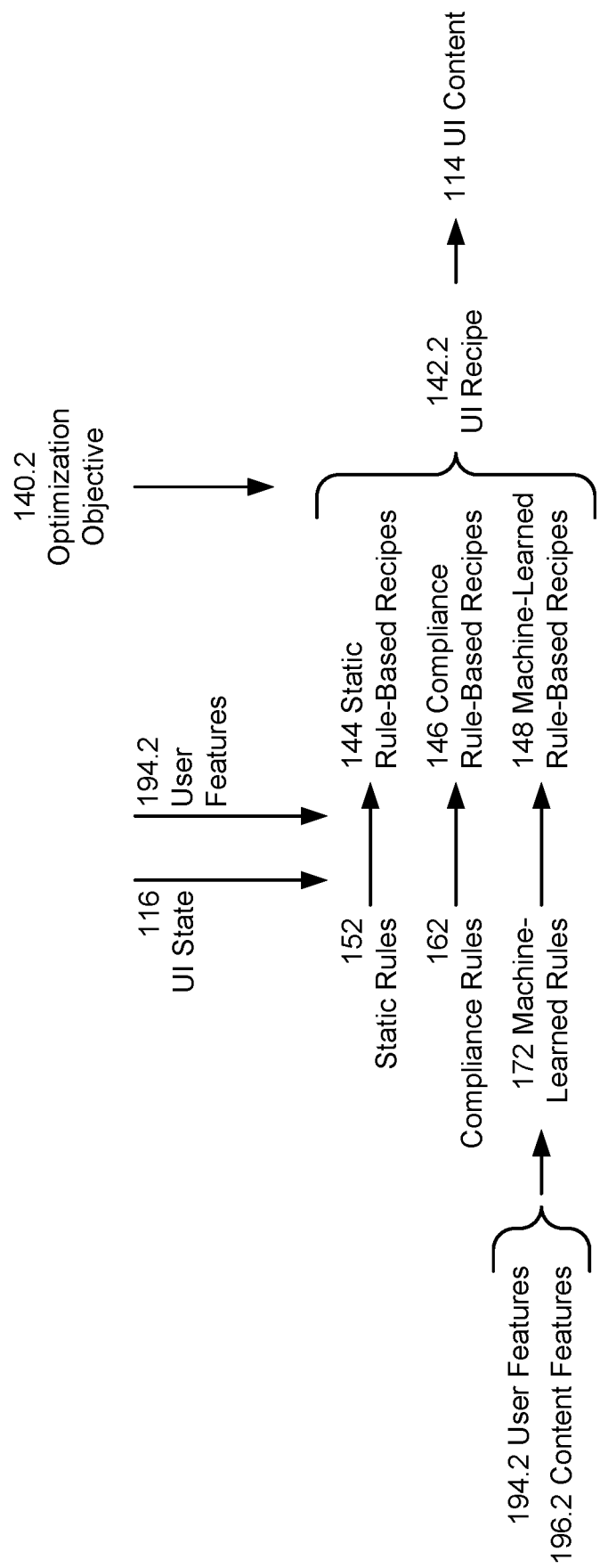
FIG. 1B shows a data flow through the system in accordance with one or more embodiments.

FIGS. 1A and 1B further describe the rule-based composition of user interfaces in accordance with one or more embodiments. While FIG. 1A shows a system for rule-based composition of user interfaces, FIG. 1B illustrates a flow of information through the system, in accordance with one or more embodiments. The system (100) may include an application (110), a content loader (120), a content repository (130), a recipe ranker (140), a static rule repository (150), a compliance rule repository (160), a machine-learned rule repository (170), a machine-learning engine (180) and a rule selection repository (190). Each of these components is subsequently described.

Figure 5A:
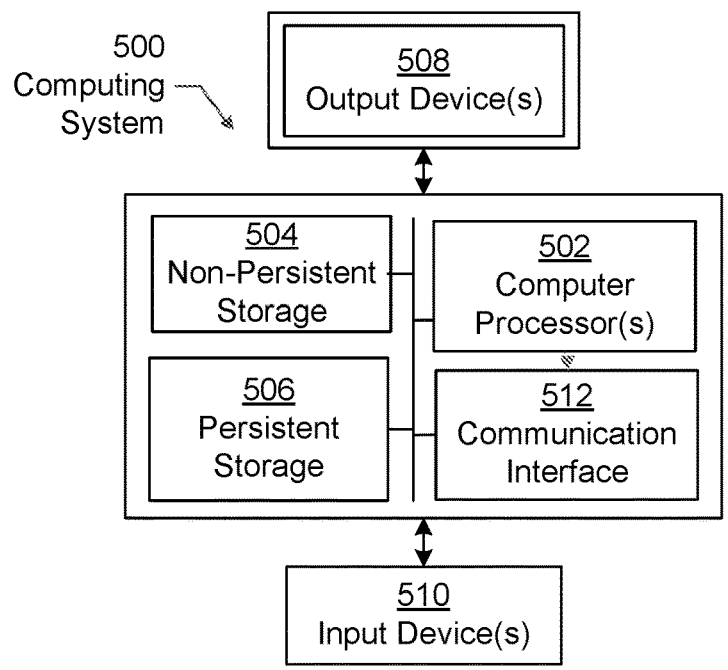
FIGS. 5A and 5B show computing systems in accordance with one or more embodiments.
Figure 5B:
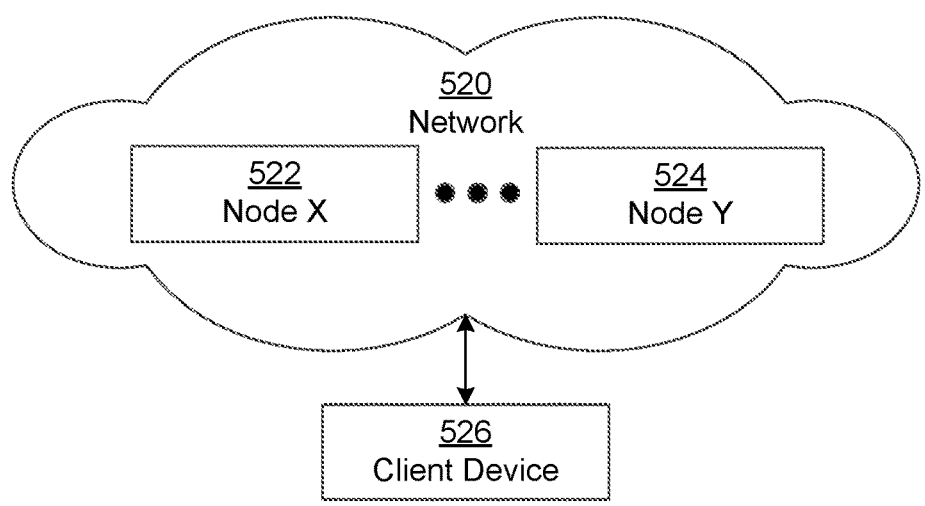

One or more embodiments may execute on a computing system, e.g., on a computing system similar to the computing system illustrated in FIGS. 5A and 5B. Some components may be distributed over multiple computing devices. For example, the application may be executed on a user's desktop computing device or portable device, whereas other components may be remote, e.g., cloud based, hosted in a data center, etc.

The application (110), in accordance with one or more embodiments, is a software application that is accessible to a user via a user interface (UI) (112). The application (110) may be, for example, an application executing on a desktop computing device or an app executing on a portable device, e.g., on a smartphone or on a tablet computing device. Alternatively, the application (110) may be remotely executing, e.g., in a cloud environment, while only a frontend is executing locally on the user's computing device. The application (110) may provide services to the user. These services may include but are not limited to, financial, accounting, tax and healthcare advice, assistance and/or other services.

The user interface (112) may enable the user to interact with the application (110), allowing the user to provide input to the application (110), to configure the application (110), and/or enabling the application (110) to provide output to the user. Accordingly, the user interface (112) may include input elements that accept user input (e.g. text fields, selectors, sliders, dials, menus and/or any other types of control and/or input elements). The user interface may further include output elements that visualize information provided by the application (110) to the user. The output elements may include text boxes, indicators, charts, graphs, animations and/or any other types of output elements. These input and/or output elements may be arranged in a display, e.g., on a computer screen or a portable device screen. Subsequently, the term UI content (114) will be used for input and/or output elements of the user interface (112). UI content (114) may additionally or alternatively include non-visual elements such as audio output of sound signals or speech, tactile output such as vibratory signals provided as haptic feedback, etc. The UI content (114), i.e., the input elements and/or output elements provided in the user interface (112), may change as the user is interacting with the application (110). For example, when the user performs an action, a different screen may be shown to the user, or individual elements of the screen may be updated. The UI content (114) is determined as subsequently described, in accordance with one or more embodiments.

In one or more embodiments, the UI content (114) to be displayed is provided to the user interface (112) by the content loader (120). The content loader (120) includes a set of machine-readable instructions (stored on a computer-readable medium) which, when executed by the content loader (120), obtains the UI content (114) from the content repository (130), based on a UI recipe (142.2 in FIG. 1B) provided by the recipe ranker (140). The UI recipe (142.2) may include the instructions needed to enable the content loader (120) to select the UI content (114) to be displayed, and to compose the UI content (114) for rendering in the user interface (112). Recipes are further described below.

The content repository (130), in accordance with one or more embodiments, includes a collection of UI content from which the content loader (120) may select the UI content (114) to be displayed by the user interface (112). The collection of UI content may include input elements and output elements, e.g., text, graphs and/or figures to be displayed, input dialog boxes, selectors, menus, etc. Those skilled in the art will appreciate that any input/output elements that could potentially be displayed in the user interface (112) may be stored in the content repository (130). The UI content (114), when requested by the content loader (120) may further undergo customization prior to displaying the UI content (114) in the user interface (112). For example, text blocks may be customized using user-specific data e.g., from the user profile registry (194), or using content from other sources (not shown), graphs may be populated with data received from elsewhere, the UI content (114) may be formatted to fit a particular screen format, etc.

The database used for the content repository may be implemented using any format suitable for the storage of UI content. The content repository may be stored in non-volatile or volatile memory, e.g. on a hard disk drive or in RAM.

In one or more embodiments, the recipe ranker (140) is configured to determine a UI recipe (142.2, in FIG. 1B) that instructs the content loader (120) to load the UI content (114) specified by the UI recipe (142.2). The recipe ranker (140), in one or more embodiments, selects the UI recipe (142.2) from a collection of recipes (142). This collection of recipes may include static rule-based recipes (144), compliance rule-based recipes (146) and/or machine-learned rule-based recipes (148). The selection of the UI recipe (142.2) from the collection of recipes (142), in accordance with one or more embodiments, may be expressed as an optimization problem with an optimization objective (140.2 in FIG. 1B). The selection of a UI recipe (142.2) may be made under consideration of a UI state (116 in FIG. 1B) and user features (194.2 in FIG. 1B), as discussed in detail with reference to FIG. 2. The UI state may be obtained from the application (110) either directly or via the content loader (120). The user features may be obtained from the rule selection repository (190).

The static rule-based recipes (144) specify the UI content that is necessary or beneficial in order to proceed as instructed by the static rules. As previously noted, such static rules may define the UI content (114) to be displayed in a manner depending on the state of the user interface. Static rules may specify, for example, that UI content U, V and W (e.g., a first text, various menu options and a text input window) are to be shown to the user when the user interface is in UI state A, whereas UI content X, Y and Z (e.g., a second text different from the first text, a toggle button and a video) are to be shown to the user when the user interface is in UI state B. The UI state may be determined based on the currently displayed UI content, a UI input made by the user, a history of previous UI states etc. Each of the static rule-based recipes (144) may be ranked, based on a likeliness that the recipe is suitable, based on the UI state, as further discussed below.

The compliance rule-based recipes (146) specify the UI content that is necessary or beneficial in order to proceed as instructed by the compliance rules. As previously noted, compliance rules, in accordance with one or more embodiments, specify UI content that may be beneficial or necessary under certain conditions. The compliance rule-based recipes (146) may be ranked, based on a likeliness that these recipes result in providing the suitable UI content to the user, as further discussed below.

The machine-learned rule-based recipes (148) specify the UI content to be provided to the user via the user interface in a manner depending on what the machine-learning engine (180) has been able to learn from available information about user behaviors, user profiles, content characterizations, etc., as described in detail below. Accordingly, machine-learned rule-based recipes may change whenever new information is considered by the machine-learning engine (180).

As illustrated in FIG. 1B, the static rule-based recipes (144), the compliance rule-base recipes (146) and the machine-learned rule-based recipes (148) may be considered in view of the optimization objective (140.2) in order to obtain the UI recipe (142.2), based on which the UI content (114) is selected. As further discussed below, the optimization objective (140.2) is an expression that is minimized or maximized, in accordance with one or more embodiments. Optimization objectives (140.2) may include but are not limited to user satisfaction, time to complete a particular task by the user, financial savings, etc.

Continuing with the discussion of FIG. 1A, the static rule repository (150), in accordance with one or more embodiments, contains a collection of static rules (152) from which the static rules, on which the static rule-based recipes (144) are based, are picked. Embodiments may rely on static rules (152) as a default option, for example, when no suitable machine-learned rules are identified. Each of the static rules may specify an action or actions to be performed given a particular state. The state may include, for example, a user interface state, e.g., a particular page being visited in the user interface, a particular user interface option being selected, etc. The state may further include other information such as user profile data to enable user-specific static rules. The action(s) to be performed may be, for example, providing the user with certain choices and/or certain information via the user interface (112), etc. The static rules (152) in the static rule repository (150) may be implemented as discrete data, e.g., in a database that stores a series of if-then rules. The static rules (152) may alternatively be implemented as connected data, e.g. in a relational database or in a graph database. Any form of database that can store static rules (152) may be used, without departing from the invention. The static rule repository (150) may be stored in non-volatile or volatile memory, e.g. on a hard disk drive or in RAM.

The compliance rule repository (160), in accordance with one or more embodiments, contains a collection of compliance rules (162) from which the compliance rules, on which the compliance rule-based recipes (146) are based, are picked. Analogous to the above-described static rules (152), each of the compliance rules (162) may specify an action or actions to be performed given a particular state. The compliance rules (162) in the compliance rule repository (160) may be implemented as discrete data, e.g., in a database that stores a series of if-then rules. The compliance rules (162) may alternatively be implemented as connected data, e.g. in a relational database or in a graph database. Any form of database that can store compliance rules may be used, without departing from the invention. The compliance rule repository (160) may be stored in non-volatile or volatile memory, e.g. on a hard disk drive or in RAM.

The machine-learned rule repository (170), in accordance with one or more embodiments, contains a collection of machine-learned rules (172) from which the machine-learned rules, on which the machine-learned rule-based recipes (146) are based, are picked. Analogous to the above-described static rules (152) and compliance rules (162), each of the machine-learned rules (172) may specify an action or actions to be performed given a particular state. The machine-learned rules (172) in the machine-learned rule repository (170) may be generated by the machine-learning engine (180) as further described with reference to FIG. 3. The machine-learned rule repository (170) may be stored in non-volatile or volatile memory, e.g. on a hard disk drive or in RAM.

The machine-learning engine (180) includes a set of machine-readable instructions (stored on a computer-readable medium) which, when executed by the payment media aggregation system (100) generates machine-learned rules (172) from which the machine-learned rule-based recipes (148) may be derived, in accordance with one or more embodiments. The machine-learning engine (180) may process data obtained from the rule selection repository (190). A detailed description of the operations performed by the machine-learning engine (180) is provided below, with reference to FIGS. 2 and 3.

The rule selection repository (190), in accordance with one or more embodiments, contains data based on which the machine learning engine (180) may generate machine-learned rules (172). These data may include data stored in a user behavior registry (192), a user profile registry (194) and a content registry (196). Each of these registries may be a separate database or at least some of the data may be combined in a single database. At least some of the data in the rule selection repository (190), e.g. user-related data, may further be used by the recipe ranker (140). Any kind of database that is suitable to store user or content-related data may be used.

The data stored in the user behavior registry (192) may include a documentation of user behaviors, e.g., user actions such as the selection of UI content, the time spent accessing certain UI content, etc. The data may have been gathered using beacons that are fired by the user interface (112) whenever a user action is detected. A beacon may include a time stamp, a user ID and a documentation of the detected user action. By collecting these beacons over time, a comprehensive history of user behaviors may be obtained, thus documenting the use of the application (110) by individual users accessing the UI content (114). User behaviors associated with a particular user may be identifiable using the user's user ID.

User profiles are stored in the user profile registry (194), in accordance with one or more embodiments. A user profile may include, for example, the user's name, the user's profession, the user's age and/or any other information that may be relevant for the use of the application (110). Those skilled in the art will appreciate that the information stored in the user profile may differ, depending on the nature of the application (110). For example, if the application (110) is used in a healthcare environment, the user profile may include a patient's health history. In contrast if the application (110) is a tax software, the user profile may include a user's financial data. User profile information associated with a particular user may be identifiable using the user's user ID. In combination, a user's profile, stored in the user profile registry (194) and the user's behavior, stored in the user behavior registry (192), provide the user's features (194.2 in FIG. 1B).

The data stored in the content registry (196) may include a characterization of the content that is stored in the content repository (130). Assume, for example, that the content in the content repository (130) includes movies. Accordingly, the characterization of a movie may include, for example, the genre of the movie (e.g., horror, comedy, documentary, action, etc.) Another characterization of the same movie may include, for example, the rating of the movie, the main actors, and other noteworthy facts that viewers may care about. The content registry (196) may include any type of characterization of any content stored in the content repository (130). Accordingly, the collection of UI content stored in the content repository (130) may be characterized by entries in the content registry (196). The combination of the characterizations that apply to a particular content form the content features (196.2 in FIG. 1B) associated with that content.

Content features (196.2) and user features (194.2), in combination, may be used by the machine-learning engine (180) to obtain machine-learned rules (172), which in turn may be used to obtain machine-learned rule-based recipes (148). The details related to generating machine-learned rules (172) from content features (196.2) and user features (194.2) and related to deriving machine-learned rule-based recipes (148) are provided below with reference to FIGS. 2 and 3.

While FIG. 1A shows a configuration of components, other configurations may be used without departing from the scope of the invention. For example, various components may be combined to create a single component. As another example, the functionality performed by a single component may be performed by two or more components that may be communicatively connected using a network connection.

Figure 2:
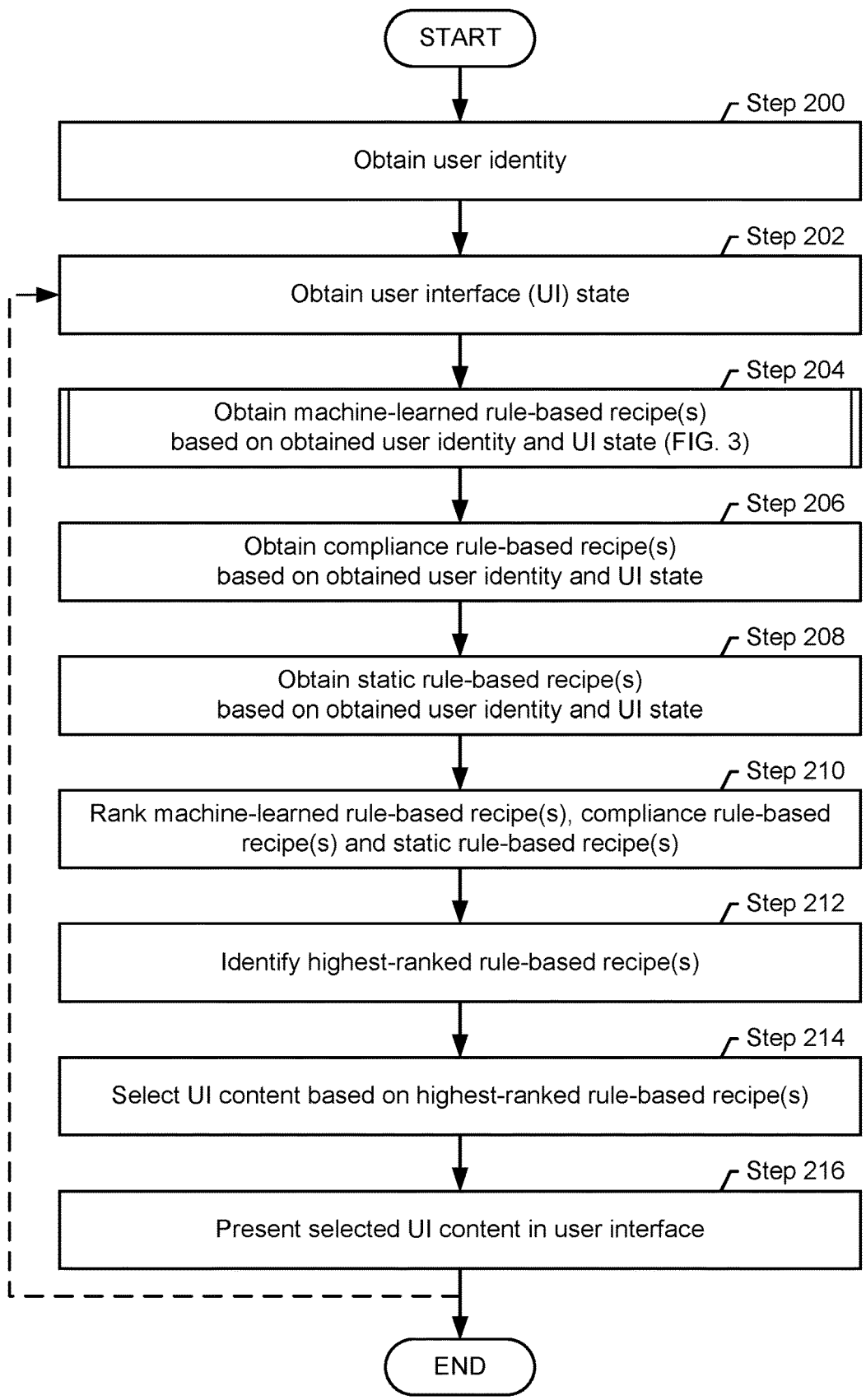
FIGS. 2 and 3 show flowcharts in accordance with one or more embodiments.
Figure 3:
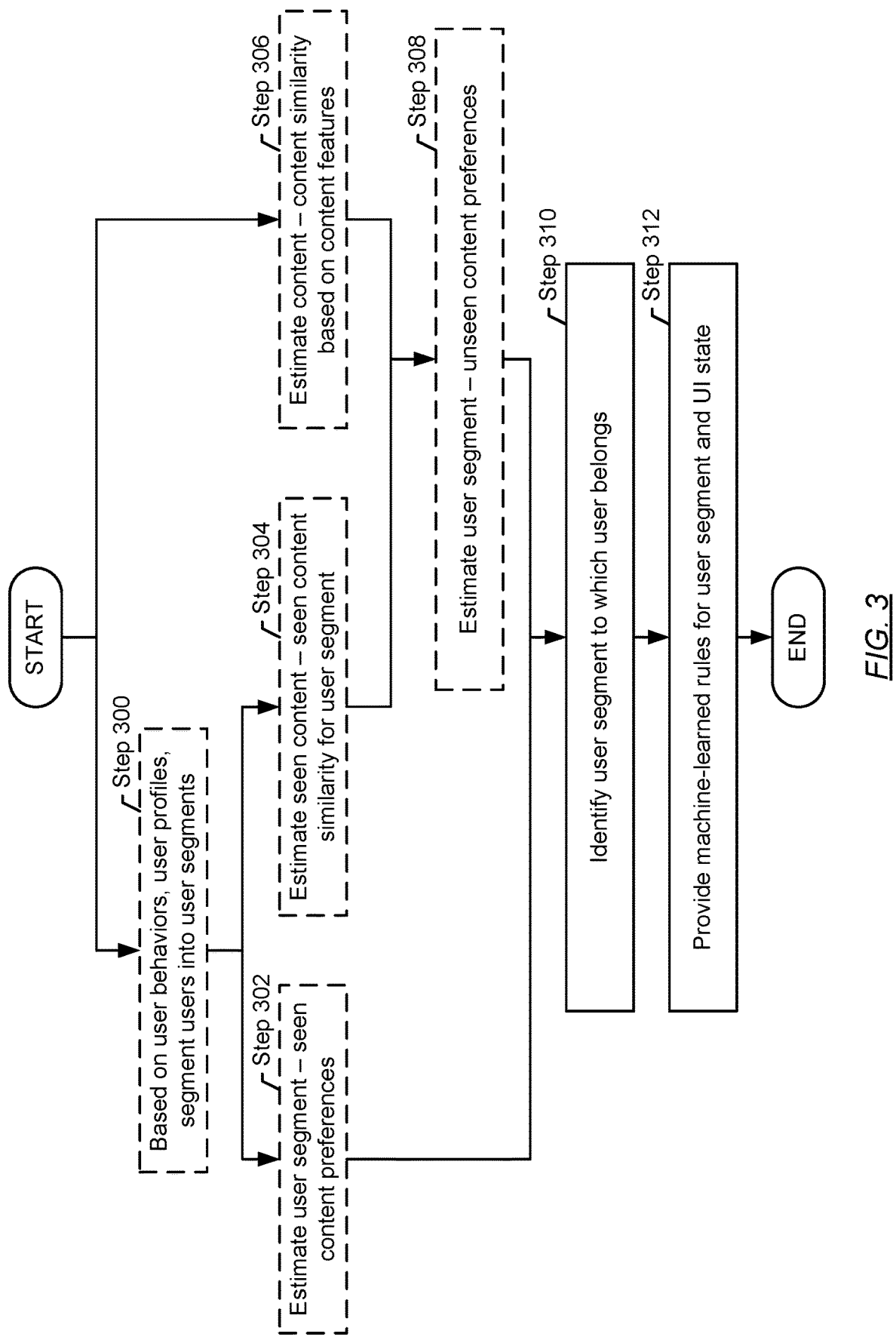

FIGS. 2 and 3 show flowcharts in accordance with one or more embodiments. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

Turning to FIG. 2, a method for a rule-based composition of a user interface, in accordance with one or more embodiments, is shown. The method may be executed whenever an updating of the user interface (UI) becomes necessary. This may occur, for example, when a user performs an action in the user interface and/or when the execution of the application necessitates the updating of UI content. When this happens, the application may call the content loader with a request for the new UI content. The request may be accompanied by the necessary information to determine the suitable UI content to be displayed in the user interface. Subsequently, the content loader may contact the recipe ranker to obtain a suitable recipe. Based on the recipe, the content loader may obtain the UI content, which may subsequently be provided to the user interface, where it may be displayed. A detailed description is subsequently provided.

In Step 200, the user identity (ID) is obtained. The user ID may uniquely identify the user that is interacting with the application, via the user interface. The user ID may be obtained, for example, based on login information that the user may have initially provided when accessing the application. The user ID may be a code, a user name, or any other identifier that enables identification of the user. Obtaining the user ID may only be performed once, e.g., when the method of FIG. 2 is executed for the first time.

In Step 202, the UI state is obtained. As previously discussed, the UI state may include, for example, the currently presented UI content, but may also include a history of previously presented UI content. The UI state may be encoded in an identifier, or it may be an expression that includes individual identifiers for the elements deemed relevant, e.g., identifiers for the UI content that is currently displayed, for a particular task that the application is currently performing and/or for a page that is currently being accessed by the user, etc.

In Step 204, machine-learned rule-based recipes are obtained based on the UI state. First, machine-learned rules may be selected from the set of machine-learned rules stored in the machine-learned rule repository. As previously noted, a rule may include one or more actions, that may be performed under certain conditions, i.e., when a certain state is present. The selection of machine-learned rules may, thus, be performed based on a matching between the UI state obtained in Step 202 and the states associated with the machine-learned rules in the machine-learned rule repository. A matching score may be assigned to each of the machine-learned rules. Depending on the matching score, a machine-learned rule may or may not be selected. Consider, for example, a user accessing an income tax return software. The user is currently completing a section related to charitable donations, via the user interface. Accordingly, the UI state reflects the fact that the charitable donation section of the application is being accessed. Accordingly, machine-learned rules that are associated with states that are related to charitable donations may be selected, whereas rules that are not associated with charitable donations may not be selected. Many criteria may be included in the state associated with a rule but also in the UI state. Accordingly, a degree of matching may be determined depending on how many criteria match. A machine-learned rule may be selected if the matching score reaches a predetermined matching threshold. Similarly, user features associated with the user ID may be considered when selecting machine-learned rules. These user features may be obtained from, for example, the user profile registry, based on the user ID obtained in Step 200. Consider, for example, the previously discussed income tax return software. In order to determine whether options associated with charitable donations are to be shown to the user, certain features of the user may be considered. For example, charitable donations are commonly made by people that have a solid income. Accordingly, if the user profile indicates that the user only earns a minimum wage, this would be an indication against providing options for charitable donations to the user.

One or more machine-learned rules may be identified in Step 204. Alternatively, no machine-learned rule may be identified, e.g., if none of the machine-learned rules in the machine-learned rule repository reaches a minimum matching score. Subsequently, each of the identified machine-learned rules may be translated into a machine-learned rule-based recipe by identifying the individual elements of the UI content to be provided via the user interface. Alternatively, the translation from machine-learned rule to machine-learned rule-based recipe may be performed at a later time, once the rule to be used by the content loader has been identified, as discussed in Step 212. A detailed description of machine-learned rules is provided below with reference to FIG. 3.

The obtained machine-learned rule-based recipes specify UI content that is meaningful, given the current UI state (and given the user features associated with the user ID, if considered). The meaningfulness of each machine-learned rule-based recipe is quantified by the matching score that was determined during the execution of Step 204. The obtained machine-learned rule-based recipes may be ranked, based on the matching score.

In Step 206, compliance rule-based recipes are obtained based on the UI state and optionally under consideration of the user ID. Compliance rules may be selected from the compliance rules stored in the compliance rule repository, analogous to how machine-learned rules are selected from the machine-learned rules stored in the machine-learned rule repository.

One or more compliance rules may be identified in Step 206. Alternatively, no compliance rule may be identified, e.g., if none of the compliance rules in the compliance rule repository reaches a minimum degree of matching. Subsequently, each of the identified compliance rules may be translated into a compliance rule-based recipe by identifying the individual elements of the UI content to be provided via the user interface. Alternatively, the translation from compliance rule to compliance rule-based recipe may be performed at a later time, once the rule to be used by the content loader has been identified, as discussed in Step 212.

In Step 208, static rule-based recipes are obtained based on the UI state and optionally under consideration of the user ID. Static rules may be selected from the static rules stored in the static rule repository, analogous to how machine-learned rules are selected from the machine-learned rules stored in the machine-learned rule repository.

One or more static rules may be identified in Step 208. Alternatively, no static rule may be identified, e.g., if none of the static rules in the static rule repository reaches a minimum degree of matching. Subsequently, each of the identified static rules may be translated into a static rule-based recipe by identifying the individual elements of the UI content to be provided via the user interface. Alternatively, the translation from static rule to static rule-based recipe may be performed at a later time, once the rule to be used by the content loader has been identified, as discussed in Step 212.

In Step 210, the machine-learned rule-based recipes, compliance rule-based recipes and static rule-base recipes are ranked. The ranking may be performed based on the matching scores that were obtained during the execution of Steps 204-208. As a result, a single list of ranked rule-based recipes may be established.

In one or more embodiments, other factors may further affect the ranking of the recipes. For example, known user preferences, user satisfaction, time-to-complete a given task, etc., may further be considered, thereby affecting the matching score. The selection of a UI recipe from the machine-learned rule-based recipes, compliance rule-based recipes and static rule-base recipes under consideration of one or more of such factors may be expressed as a convex optimization problem with an objective function based on an optimization goal of maximizing or minimization of one or more of the above factors. Those skilled in the art will appreciate that any quantifiable factor may be considered in the optimization problem.

In Step 212, the highest-ranked rule-based recipe is identified. The recipe with the highest matching score may be selected as the UI recipe. In one or more embodiments, the UI recipe is chosen from the machine-learned rule-based recipes and from the compliance rule-based recipes, whereas the static rule-based recipes are relied upon as a fallback option, e.g., for scenarios in which none of the machine-learned rule-based recipes and the compliance rule-based recipes have a sufficiently high associated matching score.

In Step 214, the UI content associated with the highest-ranked rule-based recipe is retrieved from the content repository, and subsequently, in Step 216, the retrieved UI content is rendered in the user interface, i.e., the user interface is updated with the UU content, for display to the user.

After completion of Step 216, the execution of the method may return to Step 202 to obtain an updated UI state which may consider input provided by the user, e.g., a selection. The method may, thus, be repeated until the user stops interacting with the application.

Turning to FIG. 3, a method for generating machine-learned rules, in accordance with one or more embodiments, is shown. Some of the described steps may be executed whenever a machine-learned rule is requested as described in Step 204 of FIG. 2. Other steps may need to be executed at least once, but not each time when Step 204 is executed. These steps may be performed in order to establish a machine-learned rule repository based on the outputs of Steps 300-308 (marked using dashed line style in FIG. 3). These steps may also be re-executed when new information becomes available, e.g., when content of the rule selection repository changes.

The following steps are illustrated using an example that includes a collection of movies that are watched by individuals. In this example, determining UI content to be displayed to a user, would be equivalent to selecting movies to be shown to an individual. Those skilled in the art will appreciate that the invention is not limited to the discussed exemplary selection movies. Any type of content may be selected, based on certain criteria, without departing from the invention. More specifically, the method of FIG. 3 may be used for the purpose of obtaining machine-learned rules that may be used to identify UI content to be displayed in a user interface. As previously discussed, UI content may need to be provided in a UI state-dependent manner. Accordingly, the subsequently described methods may be used to establish machine-learned rules that are suitable for generating or updating a user interface screen.

In Step 300, based on previously observed user behaviors and user profiles, users may be segmented into user segments. The resulting user segments may include users that have similarity, based on features associated with these users. Consider, for example, a user segmentation based on age, which may be one of the features stored in the user profiles. In the example of selecting a movie for an individual, segmenting users based on age may be beneficial because movie preferences may differ in an age-dependent manner. For example, while teenagers may prefer reality shows, retirees may prefer documentaries. The segmentation may be performed based on multiple features. For example, the user segmentation may be performed based on age and based on level of education. The segmentation, in accordance with one or more embodiments, is a classification task for which various classifiers including but not limited to logistic regressions, decision trees, random forests, gradient-boosted trees, multilayer perceptrons, one-vs-rest classifiers and naïve Bayes classifiers may be used. While the segmentation in Step 300 is described based on an example that involves the selection of movies, a similar segmentation may be performed for the purpose of identifying suitable UI content, in accordance with an embodiment of the invention. In this scenario, the segmentation may be performed based on a combination of user features and the UI state. The UI state may be known from the execution of Step 202, and the use features may be retrieved from the user profile registry and/or the user behavior registry, based on the user ID obtained in Step 200.

In Step 302, user segment—seen content preferences are estimated. Knowing the type of content that is preferred by a particular user segment can be beneficial when having to suggest content. Referring to the previously introduced example of recommending movies to an individual, assume that the individual is known to belong to the previously discussed segment of teenagers. A movie A is highly popular among individual in this segment. Accordingly, it may be meaningful to recommend movie A to the individual. This recommendation can be made merely based on the popularity of this movie among the individuals that form the segment. The content features do not need to be known, in order to make this recommendation. For example, it may be unknown whether movie A is a horror movie or a comedy. Accordingly, whenever a recommendation is to be made for and individual, a recommendation can be made after classifying the individual as belonging to a particular user segment. The user segment—content preference relationship may be represented by a computational model identified using supervised learning. The training data may include the members of a user segment and the content accessed by these members. A properly trained model may generalize to new users, thus, being capable of suggesting content to these new users. FIG. 4B shows exemplary content recommendations as they may be obtained. Each content recommendation may be accompanied by a score for the likeliness that the content recommendation is suitable, which may be based on, for example, the popularity of the content recommendation within the user segment. A content that is preferred by the vast majority of users in the user segment would receive a high score, whereas a content that is preferred by fewer users in the user segment would receive a lower score. The exemplary content recommendations shown in FIG. 4B are, thus, ranked based on this score. To perform Step 302 for the purpose of identifying suitable UI content, the estimation may be performed for a combination of user features and the UI state, based on the segmentation performed in Step 300.

In Step 304, seen content—seen content similarities are estimated. Based on this estimation, one may predict what content a user may prefer, based on what content the user has previously seen. Referring to the previously introduced example of recommending movies to an individual, assume that an individual has watched movie A. It is also known that the vast majority of people that has watched movie A also watched movie B, but not movie C. Accordingly, without knowing any of the movies' content features, one may recommend movie B but not movie C to the individual. Seen content—seen content similarities may be determined on a per user segment basis using for example, matrix factorization algorithms or collaborative filtering methods to perform an unsupervised similarity scoring for seen content in each of the user segments. The calculated similarities may be represented in matrix format. FIG. 4A shows an exemplary matrix that stores similarities between five different contents, with content similarity being rated from 0 (no similarity) to 1 (identical). To perform Step 304 for the purpose of identifying suitable UI content, the estimation may be performed to obtain a similarity between different types of UI content, segmented by combinations of user features and UI states, based on the segmentation performed in Step 300.

In Step 306, content—content similarity is estimated, based on content features. Based on the content similarity, one may predict what content a user may prefer. Referring to the previously introduced example of recommending movies to an individual, assume that the content features of movies A and B are very similar. For example, both movies may be action movies, the same actors may be featured in both movies, and both movies may have received high ratings. Accordingly, without knowing anything about the user, it may be reasonable to recommend movie B to the user, if he or she has watched movie A. Importantly, the content-content similarity may be used to recommend content that is new, e.g., content that has never been seen by a user, as long as the content features are documented. Content—content similarity may be determined based on an overlap of content features between different content. Features of the movie may include, for example, the genre, the actors, the rating, awards won, movie length, language, etc. Because there may be many features for each content, a dimensionality reduction may be performed, e.g., using clustering algorithms such as a principal component analysis. Subsequently distances between clusters may be used to describe the similarity of content. Content that is adjacent may receive a high score for similarity, whereas content that is remote may receive a low score for similarity. To perform Step 306 for the purpose of identifying suitable UI content, the estimation may be performed to obtain a similarity between different types of UI content, based on the documented UI content features that may be obtained from the content registry. FIG. 4A shows an exemplary matrix that stores similarities between five different contents, with content similarity being rated from "0" (no similarity) to "1" (identical). On the diagonal of the matrix, content similarity for the same content, e.g., the similarity between content 1 and content 1, content 2 and content 2, etc. is shown. This similarity is "1" by definition. Other matrix elements provide information regarding similarity of different contents. For example, the similarity between content 1 and content 2 is "0.9", indicating a high similarity, and the similarity between content 3 and content 5 is "1", indicating that the content is identical, based on the features that were evaluated. On the other hand, the similarity between content 1 and content 5 is "0", suggesting that content 1 and content 5 have nothing in common, based on the features that were evaluated. In the exemplary matrix of FIG. 4A, the matrix elements below the diagonal are not shown, because they would merely duplicate the matrix elements above the diagonal.

In Step 308, user segment—unseen content preferences are estimated. Based on the estimated seen content—seen content similarity for a user segment, obtained in Step 304, and based on content—content similarity, based on content features, obtained in Step 306, a preference for unseen content may be estimated. Consider, for example, movie Z that is new, i.e., no users have watched movie Z. However, the content features of movie Z are documented. Accordingly, based on the operations of Step 306, it may be determined that movie Z is similar to movie B, based on content feature similarity. Now assume that a user likes movie A, which in Step 304 is determined to be similar to movie B, based on preferences by the users in the user segment. Accordingly, the user may be recommended to not only watch movie B, but also movie Z. FIG. 4B shows exemplary content recommendations as they may be obtained. Analogous to the output obtained from executing Step 302, each content recommendation may be accompanied by a score for the likeliness that the content recommendation is suitable. The exemplary content recommendations shown in FIG. 4B are, thus, ranked based on this score, which ranges from "0" (which may represent "not recommended at all") to "1" (which may represent "highly recommended"). To perform Step 308 for the purpose of identifying suitable UI content, the estimation may be performed for a combination of user features and the UI state, based on the segmentation performed in Step 300.

After the execution of Steps 300-308, a set of machine-learned rules are available. These rules may provide ranked lists of content (e.g. UI content) that is suitable, given a combination of a UI state and user features, as previously segmented. These lists may be ranked, as previously discussed. In order to determine the suitable set of machine-learned rules for a specific user, given a current UI state, Steps 310 and 312 may be performed. These two steps may be performed whenever a machine-learned rule is required to update the user interface, while Steps 300-308 may, thus, be performed less frequently, e.g. initially to establish a machine-learned rule repository, and then as new information becomes available.

In Step 310, the appropriate segment (as generated in Step 300), based on a combination of the current UI state and user characteristics, is identified. The identification may be performed analogous to the classification task described in Step 300.

In Step 312, the machine-learned rules for the combination of user segment, and UI state, are obtained. Obtaining the machine-learned rules may be a lookup task, in which those machine-learned rules that match UI state and user segment are retrieved. The retrieved machine-learned rules may include machine-learned rules that are based on user segment—seen content preferences and on user segment—unseen content preferences. Each provided machine-learned rule may be accompanied by the corresponding score, as previously discussed.

Various embodiments have one or more of the following advantages. Embodiments enable the personalization of user interfaces, while considering constraints such as the requirement to present certain user interface (UI) content under certain conditions, e.g., to meet compliance requirements. Unlike conventional user interfaces that present UI content in a static, pre-determined manner, user interfaces in accordance with one or more embodiments present UI content dynamically, in a personalized, situation-dependent manner. Machine-learned models are used to represent user behaviors, preferences and content features, in accordance with one or more embodiments. As new information about content and/or users becomes available, these machine-learned models may be updated.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 5A, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rule-based composition of user interfaces, comprising:
    obtaining a user identity (ID) of a user accessing an application using a user interface;
    obtaining a user interface (UI) state of the user interface;
    establishing a machine-learned rule repository based on previously observed combinations of UI states, UI features, and user features for a plurality of users, wherein establishing the machine-learned rule repository further comprises:
        segmenting, by a classifier, the plurality of users into a plurality of segments, wherein each segment in the plurality of segments comprises a corresponding set of users for which a corresponding combination of a corresponding user feature and a corresponding UI state is defined;
        for each of the plurality of segments, estimating, using a first machine learning model (MLM), first rules comprising a user segment-content preference comprising preferred UI content that is preferred within a corresponding user segment;
        for each of the plurality of segments, estimating, using a second MLM, second rules comprising seen content-seen content similarity UI content preferences estimated according to prior UI content a user has seen; and
        estimating, using a clustering algorithm, third rules comprising content-content similarity grouping UI content according to types of UI content;
        wherein the first rules, the second rules, and the third rules are at least a part of a plurality of machine learning rules;
    obtaining a machine-learned rule from the plurality of machine learning rules;
    obtaining, based on the UI state and based on the user ID, a plurality of rule-based recipes, wherein each rule-based recipe specifies a corresponding UI content suitable for an interaction between the user and the user interface, and wherein at least one of the plurality of rule-based recipes is based on the machine-learned rule;
    identifying a first segment in the plurality of segments to which the user belongs;
    ranking each of the rule-based recipes of the plurality of rule-based recipes based on a likeliness that a corresponding rule-based recipe is suitable for the first segment;
    identifying, from the ranked plurality of rule-based recipes, a highest-ranked rule-based recipe;
    obtaining specific UI content specified by the highest-ranked rule-based recipe; and
    updating the user interface with the specific UI content.

2. The method of claim 1, further comprising, after updating the user interface, and based on an interaction of the user with the updated user interface:
    obtaining an updated UI state; and
    obtaining an updated UI content, based on the updated UI state.

3. The method of claim 1, wherein the specific UI content comprises at least one selected from a group consisting of an input element that enables the user to enter information to be provided to the application, and an output element that enables the application to provide information to the user.

4. The method of claim 1, wherein the UI state comprises at least one selected from a group consisting of currently displayed UI content, a history of previously displayed UI content, and a user input.

5. The method of claim 1, wherein obtaining the plurality of rule-based recipes comprises:
    obtaining user features associated with the user ID;
    determining, for each rule of a plurality of rules stored in a rule repository, a matching score, based on the user features associated with the user ID and based on the UI state;
    identifying a plurality of rules with at least a minimum matching score;
    for the identified plurality of rules, obtaining the plurality of rule-based recipes by identifying the specific UI content required by the rules.

6. The method of claim 1, wherein ranking the rule-based recipes comprises an optimization based on an optimization goal considering at least one selected from a group consisting of user preferences, user satisfaction, time-to-complete, and financial savings.

7. The method of claim 1, wherein at least one of the plurality of rule-based recipes is based on a compliance rule obtained from a compliance rule repository.

8. The method of claim 7, wherein at least one of the plurality of rule-based recipes is based on a static rule obtained from a static rule repository, and wherein the method further comprises:
    determining whether the machine-learned rule has a first matching score higher than a threshold value;
    determining whether the compliance rule has a second matching score higher than the threshold value; and
    identifying the static rule as the highest rank rule only after determining that no machine-learned rule has the first matching score higher than the threshold value and also determining that no compliance rule has the second matching score higher than the threshold value.

9. The method of claim 1, wherein:
    establishing the machine-learned rule repository further comprises estimating, using a third MLM, fourth rules comprising user segment-unseen content UI content preferences estimated according to a combination of the second rules and the third rules, and the fourth rules are also part of the plurality of machine learning rules.

10. A system for rule-based composition of user interfaces, comprising:

an application;

a user interface (UI) enabling a user to access the application;

a computer processor;

a machine-learned rule repository;

a machine-learned rule engine configured to establish the machine-learned rule repository based on previously observed combinations of UI states, UI features, and user features for a plurality of users, wherein the machine-learned rule engine is configured to establish the machine-learned rule repository by being configured to:

segment, by a classifier, the plurality of users into a plurality of segments, wherein each segment in the plurality of segments comprises a corresponding set of users for which a corresponding combination of a corresponding user feature and a corresponding UI state is defined;

for each of the plurality of segments, estimate, using a first machine learning model (MLM), first rules comprising a user segment-content preference comprising preferred UI content that is preferred within a corresponding user segment;

for each of the plurality of segments, estimate, using a second MLM, second rules comprising seen content-seen content similarity UI content preferences estimated according to prior UI content a user has seen; and estimate, using a clustering algorithm, third rules comprising content-content similarity grouping UI content according to types of UI content;

wherein the first rules, the second rules, and the third rules are at least a part of a plurality of machine learning rules;

a recipe ranker executing on the computer processor configured to:

obtain a user identity (ID) of the user accessing the application using the user interface;

obtain a UI state of the user interface;

obtain a machine-learned rule from the plurality of machine learning rules;

obtain, based on the UI state and based on the user ID, a plurality of rule-based recipes, wherein each rule-based recipe specifies a corresponding UI content suitable for an interaction between the user and the user interface, and wherein at least one of the plurality of rule-based recipes is based on the machine-learned rule;

identify a first segment in the plurality of segments to which the user belongs;

rank each of the rule-based recipes of the plurality of rule-based recipes based on a likeliness that a corresponding rule-based recipe is suitable for the first segment;

identify, from the ranked plurality of rule-based recipes, a highest-ranked rule-based recipe; and a content loader configured to obtain specific UI content specified by the highest-ranked rule-based recipe, and wherein the user interface is updated with the specific UI content.

11. The system of claim 10, further comprising:

a content repository comprising a collection of UI content that is displayable in the user interface, wherein the content loader obtains the specific UI content specified by the highest-ranked rule-based recipe from the collection of UI content in the content repository.

12. The system of claim 10, wherein the recipe ranker is further configured to, after the updating of the user interface, and based on an interaction of the user with the updated user interface, obtain an updated UI state, and wherein the content loader is further configured to obtain an updated UI content, based on the updated UI state.

13. The system of claim 10 wherein obtaining the plurality of rule-based recipes comprises:

obtaining user features associated with the user ID;

determining, for each rule of a plurality of rules stored in a rule repository, a matching score, based on the user features associated with the user ID and based on the UI state;

identifying a plurality of rules with at least a minimum matching score;

for the identified plurality of rules, obtaining the plurality of rule-based recipes by identifying the specific UI content required by the rules.

14. The system of claim 10, wherein ranking the rule-based recipes comprises an optimization based on an optimization goal considering at least one selected from a group consisting of user preferences, user satisfaction, time-to-complete, and financial savings.

15. The system of claim 10, further comprising a compliance rule repository, wherein at least one of the plurality of rule-based recipes is based on a compliance rule obtained from the compliance rule repository.

16. The system of claim 15, further comprising a static rule repository, wherein at least one of the plurality of rule-based recipes is based on a static rule obtained from the static rule repository, and wherein the recipe ranker is further configured to:

determine whether the machine-learned rule has a first matching score higher than a threshold value;

determine whether the compliance rule has a second matching score higher than the threshold value; and identify the static rule as the highest rank rule only after determining that no machine-learned rule has the first matching score higher than the threshold value and also determining that no compliance rule has the second matching score higher than the threshold value.

17. The system of claim 10, wherein the machine-learned rule engine is further configured to establish the machine-learned rule repository by being further configured to:

further establish the machine-learned rule repository by estimating, using a third MLM, fourth rules comprising user segment-unseen content UI content preferences estimated according to a combination of the second rules and the third rules, and wherein the fourth rules are also part of the plurality of machine learning rules.

18. A non-transitory computer readable medium comprising computer readable program code for causing a computer system to:

obtain a user identity (ID) of a user accessing an application using a user interface;

obtain a user interface (UI) state of the user interface;

establish a machine-learned rule repository based on previously observed combinations of UI states, UI features, and user features for a plurality of users, wherein the computer readable program code for establishing the machine-learned rule repository further comprises computer readable program code for causing the computer system to:
- segment, by a classifier, the plurality of users into a plurality of segments, wherein each segment in the plurality of segments comprises a corresponding set of users for which a corresponding combination of a corresponding user feature and a corresponding UI state is defined;
- for each of the plurality of segments, estimate, using a first machine learning model (MLM), first rules comprising a user segment-content preference comprising preferred UI content that is preferred within a corresponding user segment;
- for each of the plurality of segments, estimate, using a second MLM, second rules comprising seen content-seen content similarity UI content preferences estimated according to prior UI content a user has seen; and
- estimate, using a clustering algorithm, third rules comprising content-content similarity grouping UI content according to types of UI content;
- wherein the first rules, the second rules, and the third rules are at least a part of a plurality of machine learning rules;
- obtain a machine-learned rule from the plurality of machine learning rules;
- obtain, based on the UI state and based on the user ID, a plurality of rule-based recipes, wherein each rule-based recipe specifies a corresponding UI content suitable for an interaction between the user and the user interface, and wherein at least one of the plurality of rule-based recipes is based on the machine-learned rule;
- identify a first segment in the plurality of segments to which the user belongs;
- rank each of the rule-based recipes of the plurality of rule-based recipes based on a likeliness that a corresponding rule-based recipe is suitable for the first segment;
- identify, from the ranked plurality of rule-based recipes, a highest-ranked rule-based recipe;
- obtain specific UI content specified by the highest-ranked rule-based recipe; and
- update the user interface with the specific UI content.

19. The non-transitory computer readable medium of claim 18, wherein the computer readable program code further causes the computer system to, after updating the user interface, and based on an interaction of the user with the updated user interface:
- obtain an updated UI state; and
- obtain an updated UI content, based on the updated UI state.

20. The non-transitory computer readable medium of claim 18, wherein obtaining the plurality of rule-based recipes comprises:
- obtaining user features associated with the user ID;
- determining, for each rule of a plurality of rules stored in a rule repository, a matching score, based on the user features associated with the user ID and based on the UI state;
- identifying a plurality of rules with at least a minimum matching score;
- for the identified plurality of rules, obtaining the plurality of rule-based recipes by identifying the specific UI content required by the rules.

21. The non-transitory computer readable medium of claim 18, wherein ranking the rule-based recipes comprises an optimization based on an optimization goal considering at least one selected from a group consisting of user preferences, user satisfaction, time-to-complete, and financial savings.

22. The non-transitory computer readable medium of claim 18, wherein at least one of the plurality of rule-based recipes is based on a compliance rule obtained from a compliance rule repository.

23. The non-transitory computer readable medium of claim 22, wherein at least one of the plurality of rule-based recipes is based on a static rule obtained from a static rule repository, and wherein the computer readable program code is further for causing the computer system to:
- determine whether the machine-learned rule has a first matching score higher than a threshold value;
- determine whether the compliance rule has a second matching score higher than the threshold value; and
- identify the static rule as the highest rank rule only after determining that no machine-learned rule has the first matching score higher than the threshold value and also determining that no compliance rule has the second matching score higher than the threshold value.

24. The non-transitory computer readable medium of claim 18, wherein the computer readable program code for causing the computer system to establish the machine-learned rule repository further comprises computer readable program code for causing the computer system to:
- further establish the machine-learned rule repository by estimating, using a fifth MLM, fourth rules comprising user segment-unseen content UI content preferences estimated according to a combination of the second rules and the third rules, and
- wherein the fourth rules are also part of the plurality of machine learning rules.

* * * * *